United States Patent
Assaad et al.

(10) Patent No.: US 9,866,113 B1
(45) Date of Patent: Jan. 9, 2018

(54) MULTILEVEL BUCK CONVERTER WITH A FLYING CAPACITOR AND CHARGE PUMP

(71) Applicant: TEXAS INSTRUMENTS INCORPORATED, Dallas, TX (US)

(72) Inventors: Rida Shawky Assaad, Murphy, TX (US); David Wayne Evans, Bentonville, AR (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/379,746

(22) Filed: Dec. 15, 2016

(51) Int. Cl.
H02M 3/07 (2006.01)
H02M 1/00 (2006.01)

(52) U.S. Cl.
CPC ...... *H02M 3/07* (2013.01); *H02M 2001/0009* (2013.01); *H02M 2003/078* (2013.01)

(58) Field of Classification Search
CPC ...................... H02M 3/07–2003/078
See application file for complete search history.

(56) References Cited

U.S. PATENT DOCUMENTS

| | | | |
|---|---|---|---|
| 6,812,782 B2 | 11/2004 | Grant | |
| 7,612,603 B1 * | 11/2009 | Petricek | H02M 3/07 307/109 |
| 8,854,019 B1 * | 10/2014 | Levesque | H02M 3/07 323/266 |
| 2012/0313701 A1 * | 12/2012 | Khlat | H02M 3/07 330/127 |
| 2015/0340952 A1 | 11/2015 | Manohar et al. | |
| 2016/0118886 A1 * | 4/2016 | Zhang | H02M 3/158 323/271 |
| 2017/0055322 A1 * | 2/2017 | Jiang | H02M 3/07 |

* cited by examiner

*Primary Examiner* — Harry Behm
*Assistant Examiner* — Peter Novak
(74) *Attorney, Agent, or Firm* — John R. Pessetto; Charles A. Brill; Frank D. Cimino

(57) ABSTRACT

Methods and apparatus for flying capacitor balancing in multilevel converters are disclosed. Example flying capacitor balancing circuitry can include voltage difference sense and control circuitry and duty cycle timing adjustment circuitry. The voltage difference sense and control circuitry can generate a compensation control signal for the duty cycle timing adjustment circuitry.

20 Claims, 9 Drawing Sheets

MULTILEVEL BUCK CONVERTER WITH A FLYING CAPACITOR AND CHARGE PUMP

FIELD OF THE DISCLOSURE

This disclosure relates generally to multilevel DC-DC converters and, more particularly, to methods and apparatus for flying capacitor balancing in multilevel DC-DC converters.

BACKGROUND

CMOS technology is being aggressively scaled to reduce physical dimensions and supply voltage to meet low power, low area and high performance specifications, for example, in portable electronics and other applications. Also, new battery chemistries seek to extend device usage to lower voltages. However, certain loads require regulated higher voltages for proper operation, and are generally powered using a DC-DC converter to convert a lower Direct Current (DC) supply voltage into a desired higher DC voltage.

Various circuit topologies can be used in DC-DC converters. Some circuit topologies use a flying capacitor. While the flying capacitor provides some advantages, some challenges remain.

SUMMARY

In the described examples, methods and apparatus for flying capacitor balancing in multilevel DC-DC converters are disclosed. In certain described examples, flying capacitor balancing circuitry can include voltage difference sense and control circuitry and duty cycle timing adjustment circuitry. The voltage difference sense and control circuitry can generate a compensation control signal for the duty cycle timing adjustment circuitry. In other described examples, a method of operating a multilevel DC-DC converter in an operating mode having a duty cycle includes driving respective control gates of at least four series connected primary switches of the multilevel DC-DC converter in the duty cycle of the operating mode, sensing when there is a difference between a voltage of the flying capacitor and half of a DC voltage rail of the multilevel DC-DC converter, and generating a compensation control signal in response to the difference between the voltage of flying capacitor and half of the DC voltage rail. The method can further include generating a duty cycle adjustment signal in response to the compensation control signal, and can include adjusting the duty cycle of the operating mode of the multilevel DC-DC converter in response to the duty cycle adjustment signal, and can include balancing the voltage of the flying capacitor to be half of the DC voltage rail of the multilevel DC-DC converter.

DETAILED DESCRIPTION

Figure 1A:
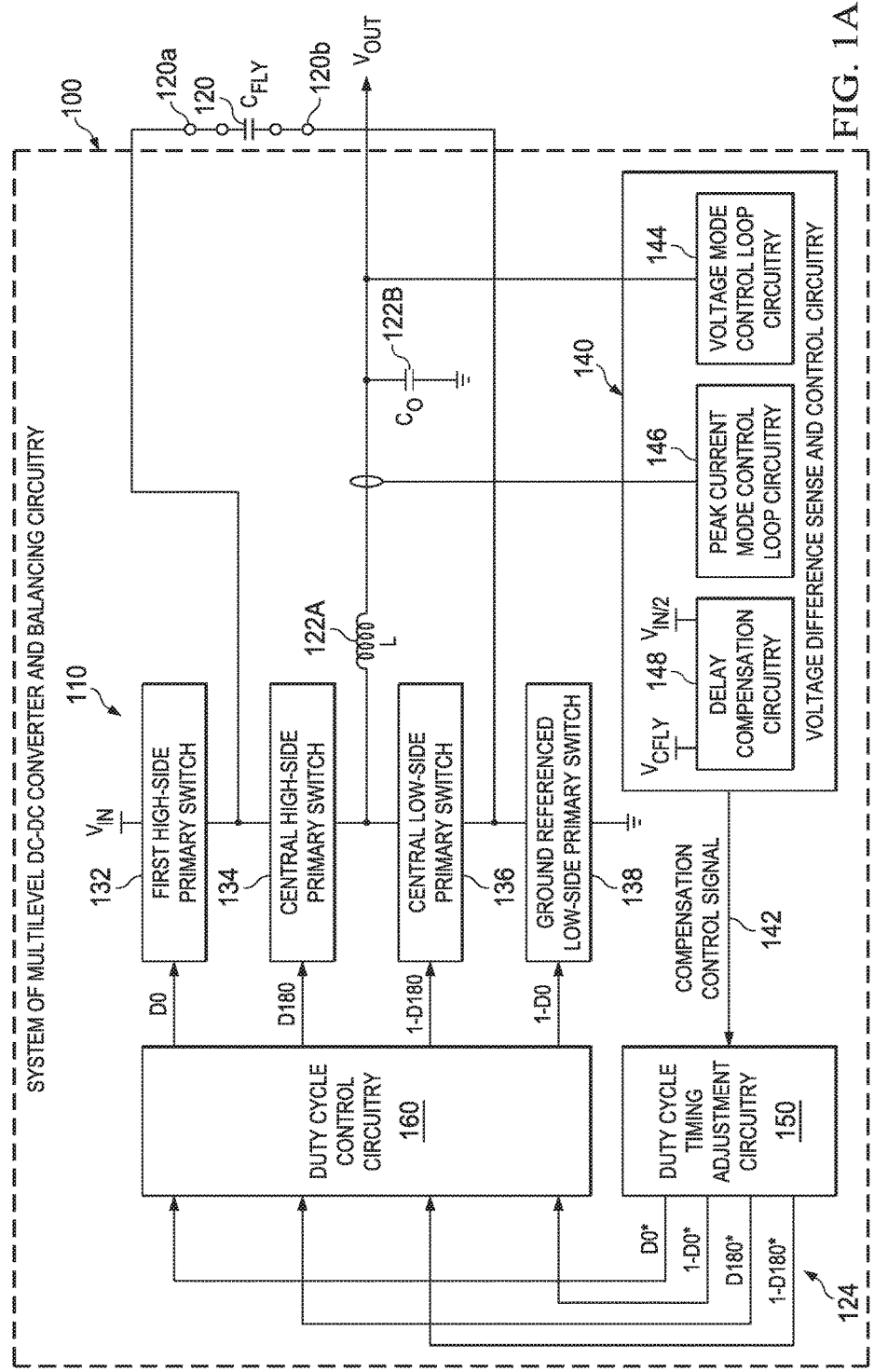
FIG. 1A is partial block diagram of a multilevel DC-DC converter circuit topology for a flying capacitor, including flying capacitor balancing circuitry of this disclosure.

FIG. 1A is partial block diagram of a system 100 of a multilevel DC-DC converter circuitry topology 110 for a flying capacitor 120, and flying capacitor balancing circuitry 124 of this disclosure. In the example of FIG. 1A, the multilevel DC-DC converter 110 is a three level DC-DC converter 110. Although the multilevel DC-DC converter circuit topology 110 is for use with flying capacitor 120, in many examples the multilevel DC-DC converter 110 is packaged in an integrated circuitry package separate from the flying capacitor 120. The multilevel DC-DC converter 110 can be electrically coupled with flying capacitor 120 external to the integrated circuit package through flying capacitor couplers 120A, 120B. In operation, multilevel DC-DC converter 110 has an operating mode having a duty cycle.

In the example of FIG. 1A, multilevel DC-DC converter 110 includes a series connection of at least four primary switches 132, 134, 136, 138 extending between a DC voltage rail VIN and a ground reference. The at least four primary switches 132, 134, 136, 138 include a central high-side primary switch 134 coupled in series between a first high-side primary switch 132 and a central low-side primary switch 136. The central low-side primary switch 136 is coupled in series between the central high-side primary switch 134 and a ground referenced low-side primary switch 138. The multilevel DC-DC converter 110 includes an output node VOUT coupled between the central high-side primary switch 134 and the central low-side primary switch 136 to provide an output voltage of the multilevel DC-DC converter 110. An inductor 122A having an output inductance L can be coupled in series with the output node VOUT. An output capacitor 122B having an output capacitance C0 can be coupled in parallel with the output voltage of the output node VOUT.

Flying capacitor couplers include a first coupling node 120A to a series connection of the first high-side primary switch 132 and the central high-side primary switch to 134. The flying capacitor couplers further include a second coupling node 120B to a series connection of the central low-side primary switch 136 and the ground referenced low-side primary switch 138.

In the example of FIG. 1A, to facilitate balancing of the voltage of the flying capacitor 120 (VCFLY), voltage difference sense and control circuitry 140 is coupled with the DC voltage rail (VIN) and the first coupling node of the flying capacitor 120 to sense when there is a difference between the voltage of flying capacitor 120 (VCFLY) and half of the DC voltage rail (VIN/2). More particularly, the voltage difference sense and control circuitry 140 includes delay compensation circuitry 148 coupled with the DC voltage rail (VIN) and the first coupling node of the flying capacitor 120 to sense when there is a difference between the voltage of flying capacitor 120 (VCFLY) and half of the DC voltage rail (VIN/2), and to facilitate balancing of the voltage of the flying capacitor 120 (VCFLY). Voltage difference sense and control circuitry 140 generates a compensation control signal 142 in response to the difference between the voltage of the flying capacitor 120 (VCFLY) and half of the DC voltage rail (VIN/2) to facilitate balancing of the voltage of the flying capacitor 120 (VCFLY).

As shown in the example of FIG. 1A, a duty cycle timing adjustment circuitry 150 is coupled with the voltage difference sense and control circuitry 140 to receive the compensation control signal 142, and to generate duty cycle adjustment signals (D0*, D180*, 1-D180*, 1-D0*) in response to the compensation control signal 142. Duty cycle control circuitry 160 is coupled between the duty cycle timing adjustment circuitry 150 and control gate inputs of the four primary switches 132, 134, 136, 138 of the multilevel DC-DC converter 110 to adjust duty cycle of the operating mode of the multilevel DC-DC converter 110 in response to the duty cycle adjustment signals (D0*, D180*, 1-D180*, 1-D0*), and to balance the voltage of the flying capacitor 120 to be half of the DC voltage rail (VIN/2).

In the example of FIG. 1A, the duty cycle control circuitry 160 drives the control gate of the first high side primary switch 132 with a first duty cycle control signal understood as a zero-phase reference duty cycle control signal D0. The duty cycle control circuitry 160 drives the control gate of the central high side primary switch 134 with a second duty cycle control signal understood as being D180, one hundred and eighty degrees out of phase with the first, zero phase reference, duty cycle control signal D0. The duty cycle control circuitry 160 drives the control gate of the central low side primary switch 136 with a third duty cycle control signal understood as being 1-D180, an inverse of the second duty cycle control signal. The duty cycle control circuitry 160 drives the control gate of the ground referenced low side primary switch 138 with a fourth duty cycle control signal understood as being 1-D0, an inverse of the first duty cycle control signal. Accordingly, duty cycle timing adjustment circuitry 150 generates four duty cycle adjustment signals, D0*, D180*, 1-D180* and 1-D0*, corresponding to the respective four duty cycle control signals D0, D180, 1-D180 and 1-D0.

In the example of FIG. 1A, the voltage difference sense and control circuitry 140 includes peak current mode control loop circuitry 146 operating to control balance of the voltage of the flying capacitor at half of the DC voltage rail (VIN/2). The voltage difference sense and control circuitry 140 also includes voltage mode control loop circuitry 144 operating to further control balance of the voltage of the flying capacitor 120 at half of the DC voltage rail (VIN/2).

In the example of FIG. 1A, the peak current mode control loop circuitry 146 includes an input coupled with the output node of the multilevel DC-DC converter 110 to sense a peak current at the output node of the multilevel DC-DC converter 110 when the multilevel DC-DC converter 110 is operating in the operating mode of the multilevel DC-DC converter 110. The voltage mode control loop circuitry 144 includes an input coupled with the output node of the multilevel DC-DC converter 110 to sense a voltage at the output node of the multilevel DC-DC converter 110 when the multilevel DC-DC converter 110 is operating in the operating mode of the multilevel DC-DC converter 110.

Figure 1B:
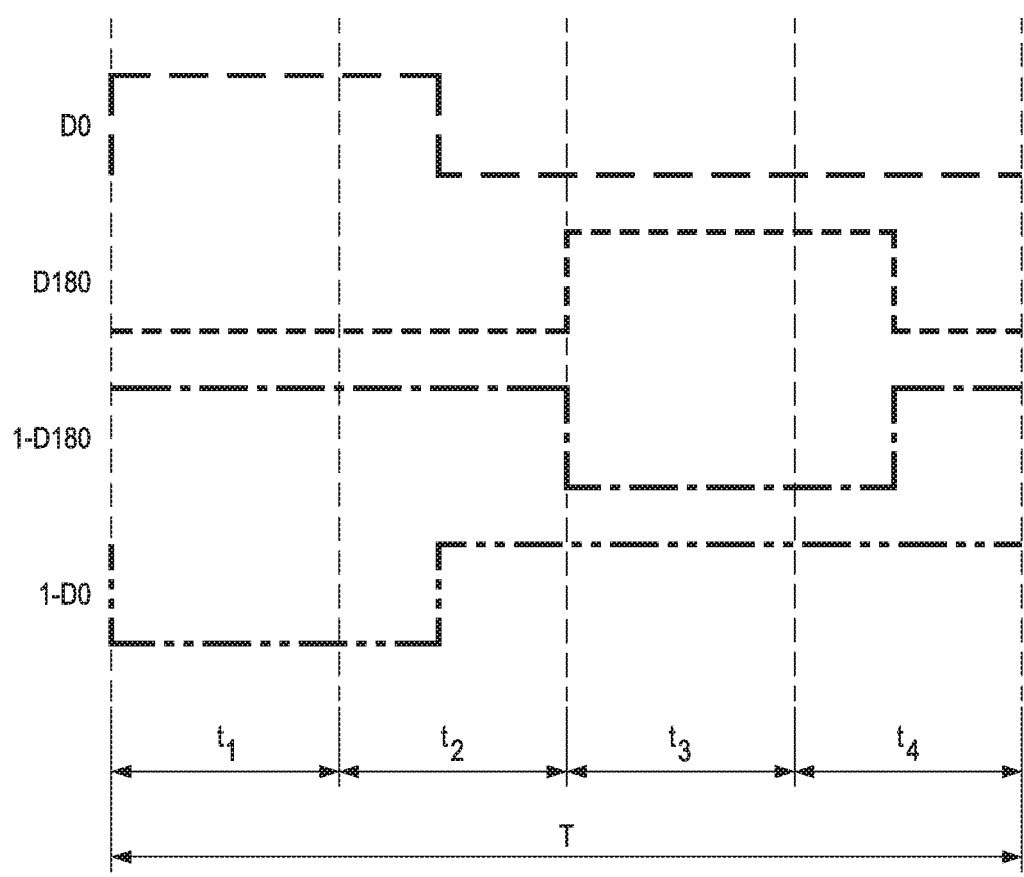
FIG. 1B is a timing diagram showing an example duty cycle of an operating mode of the multilevel DC-DC converter of FIG. 1A.

FIG. 1B is a timing diagram showing an example duty cycle of an operating mode of the multilevel DC-DC converter of FIG. 1A. In the example of FIG. 1A, an example duty cycle of between 25% and 50% (25%<D0<50%) is shown, for a full period T made up of four quarter periods, t1, t2, t3, t4. In the example of FIG. 1A, the duty cycle control circuitry drives the control gate of the first high side primary switch 132 with a first duty cycle control signal understood as a zero-phase reference duty cycle control signal D0. The duty cycle control circuitry drives the control gate of the central high side primary switch 134 with a second duty cycle control signal shown in the example timing diagram of FIG. 1B as being D180, one hundred and eighty degrees out of phase with the first, zero phase reference, duty cycle control signal D0. The duty cycle control circuitry drives the control gate of the central low side primary switch 136 with a third duty cycle control signal shown in the example timing diagram of FIG. 1B as being 1-D180, an inverse of the second duty cycle control signal. The duty cycle control circuitry 160 drives the control gate of the ground referenced low side primary switch 138 with a fourth duty cycle control signal shown in the example timing diagram of FIG. 1B as being 1-D0, an inverse of the first duty cycle control signal.

Figure 2A:
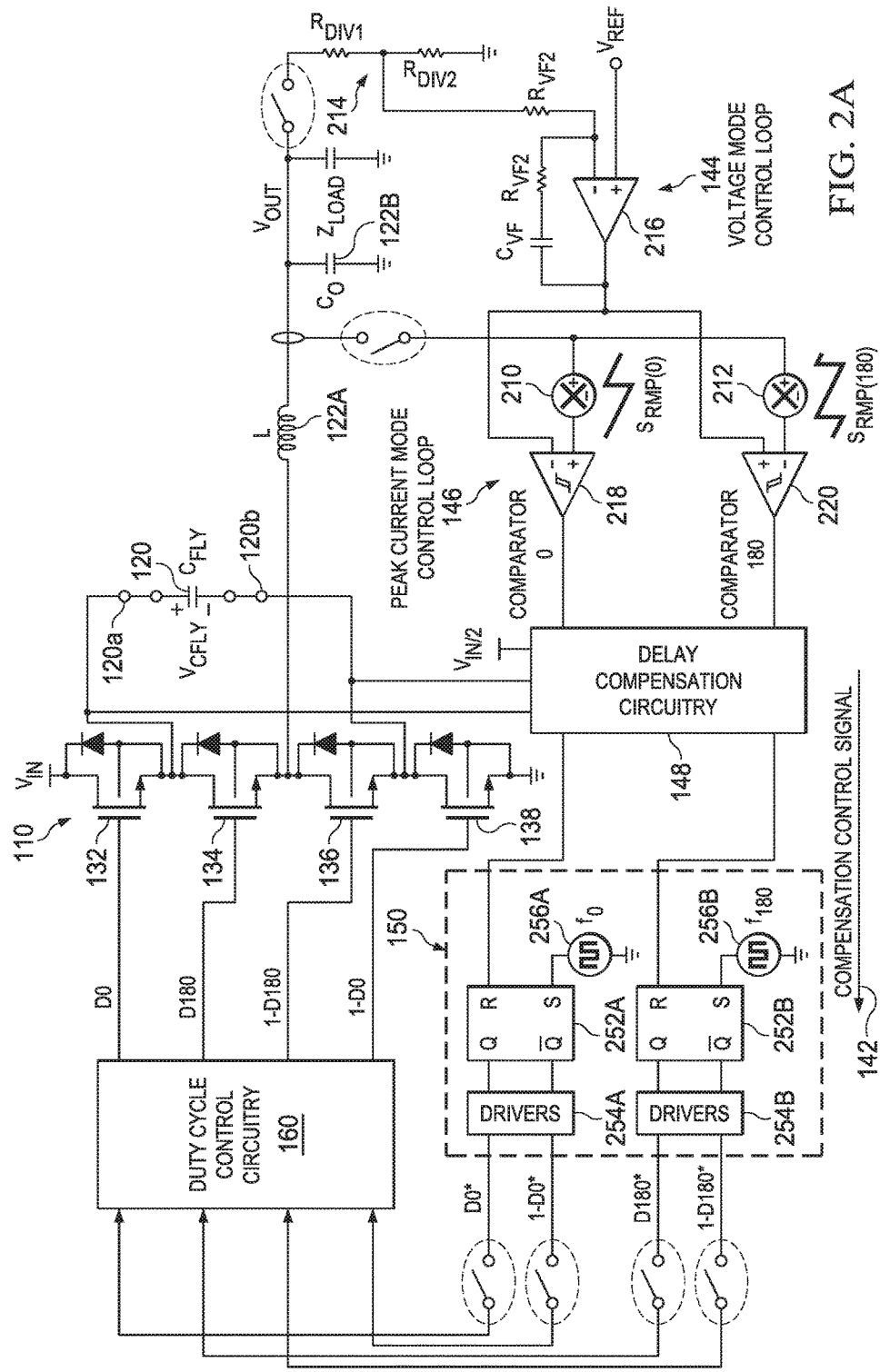
FIG. 2A is a more detailed circuit diagram of the DC-DC converter shown in FIG. 1A, but with notional switches opened and used in FIG. 2A for the purposes of illustration to disconnect the flying capacitor balancing circuitry.
Figure 3A:
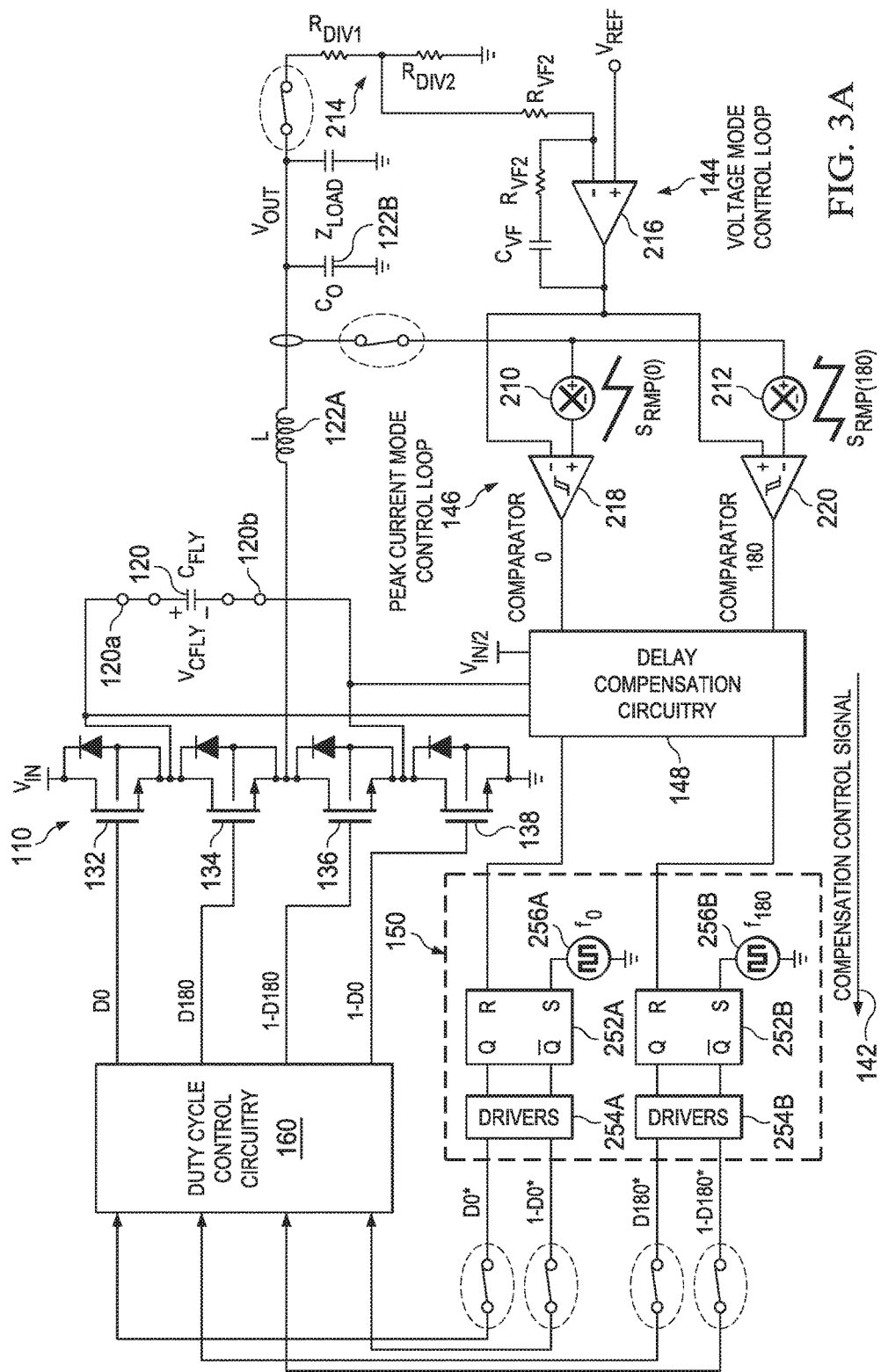
FIG. 3A is a more detailed circuit diagram of the DC-DC converter shown in FIG. 1A, but with notional switches closed and used in FIG. 3 for the purposes of illustration to connect for operation of the flying capacitor balancing circuitry.

FIGS. 2A and 3A are more detailed circuit diagrams of the DC-DC converter shown in FIG. 1A. Notional switches are opened and used in FIG. 2A for the purposes of illustration to disconnect the flying capacitor balancing circuitry. Notional switches are closed and used in FIG. 3A for the purposes of illustration to connect for operation of the flying capacitor balancing circuitry.

In the example of FIGS. 2A and 3A, multilevel DC-DC converter 110 includes the series connection of at least four primary switches 132, 134, 136, 138 extending between the DC voltage rail (VIN) and the ground reference. The at least four primary switches 132, 134, 136, 138 include the central high-side primary switch 134 coupled in series between the first high-side primary switch 132 and the central low-side primary switch 136. The central low-side primary switch 136 is coupled in series between the central high-side primary switch 134 and the ground referenced low-side primary switch 138. In the example of FIGS. 2A and 3A, the primary switches 132, 134, 136, 138 are made of semiconductor elements of turn-off type controllable by respective control gates. For example, in FIGS. 2A and 3A, the primary switches 132, 134, 136, 138 are shown as transistors 132, 134, 136, 138 of types known in the art for use in DC-DC converters. Respective diodes are shown in the example FIGS. 2A and 3A as connected anti-parallel with the primary switches 132, 134, 136, 138.

The multilevel DC-DC converter 110 includes voltage of the output node VOUT coupled between the central high-side primary switch 134 and the central low-side primary switch 136. The inductor 122A having output inductance L is shown coupled in series with the voltage of the output node VOUT. An output capacitor 122B having output capacitance C0, and an output load ZLOAD are shown as coupled in parallel with the voltage of the output node VOUT.

In the example of FIGS. 2A and 3A, flying capacitor couplers 120A, 120B include the first coupling node 120A to the series connection of the first high-side primary switch 132 and the central high-side primary switch to 134. The flying capacitor couplers 120A, 120B further include the second coupling node 120B to the series connection of the central low-side primary switch 136 and the ground referenced low-side primary switch 138. In the Example of FIGS. 2A and 3A, to facilitate balancing of the voltage (VCFLY) of the flying capacitor 120, delay compensation circuitry 148 is coupled with the DC voltage rail (VIN) and the first coupling node of the flying capacitor 120 to sense when there is a difference between the voltage (VCFLY) of flying capacitor 120 and half of the DC voltage rail (VIN/2). Delay compensation circuitry 148 generates the compensation control signal 142 in response to the difference between the voltage of flying capacitor and half of the DC voltage rail (VIN/2).

In the examples of FIGS. 2A and 3A, duty cycle timing adjustment circuitry 150 is coupled with the voltage difference sense and control circuitry 140 to generate a duty cycle adjustment signal in response to the compensation control signal 142 generated by the voltage difference sense and control circuitry 140. Duty cycle timing adjustment circuitry 150 can include RS flip flops 252A, 252B and driver circuitry 254A, 254B as shown in the example of FIGS. 2A and 3A. A first one of the RS flip flops 252A can be clocked at its S set input by a zero phase clock 256A, while a second one of the RS flip flops 252B can be clocked at its S set input of an antiphase or 180 degree phase clock 256B. Duty cycle control circuitry 160 is coupled between the duty cycle timing adjustment circuitry 150 and control gate inputs of the four primary switches 132, 134, 136, 138 of the multilevel DC-DC converter 110 to adjust duty cycle of the operating mode of the multilevel DC-DC converter 110 in response to the duty cycle adjustment signal, and to balance the voltage of the flying capacitor 120 to be half of the DC voltage rail (VIN/2).

As shown in the example of FIGS. 2A and 3A, the peak current mode control loop circuitry 146 includes the input coupled with the output node of the multilevel DC-DC converter 110 to sense the peak current at the output node of the multilevel DC-DC converter 110 when the multilevel DC-DC converter 110 is operating in the operating mode of the multilevel DC-DC converter 110. The voltage mode control loop circuitry 144 includes the input coupled with the output node of the multilevel DC-DC converter 110 to sense a voltage at the output node of the multilevel DC-DC converter 110 when the multilevel DC-DC converter 110 is operating in the operating mode of the multilevel DC-DC converter 110. As shown in the example of FIGS. 2A and 3A, the voltage mode control loop circuitry 144 includes voltage divider circuitry 214 to divide the voltage sensed at the output node of the multilevel DC-DC converter into a divided voltage. The voltage mode control loop circuitry 144 further includes a first differential amplifier 216 to compare a voltage reference to the divided voltage and to generate an output difference voltage signal. The peak current mode control loop circuitry 146 includes a first peak current ramp generator 210 generating a first peak current ramp output in response to the peak current sensed at the output node of the multilevel DC-DC converter 110 in differential relative to zero phase ramp (SRMP(0)). The peak current mode control loop circuitry 146 further includes a second differential amplifier 218 to compare the first peak current ramp output of the first peak current ramp generator 210 to the output difference voltage signal of the voltage mode control loop circuitry 144 and to generate a first peak current difference signal. The peak current mode control loop circuitry 146 includes a second peak current ramp generator 212 generating a second peak current ramp output in response to the peak current sensed at the output node of the multilevel DC-DC converter 110 in differential relative to 180 degree delayed phase ramp (SRMP(180)). The first peak current ramp generator generating the first peak current ramp output and the second peak current ramp generator generating the second peak current ramp output are in antiphase with one another, or one hundred and eighty degrees out of phase with one another.

As shown in the example of FIGS. 2A and 3A, the peak current mode control loop circuitry 146 includes a third differential amplifier 220 to compare the second peak current ramp output of the second peak current ramp generator to the output difference voltage signal of the voltage mode control loop circuitry 144 and to generate a second peak current difference signal. The first and second peak current difference signals are coupled to inputs of the delay compensation circuitry 140, which also does comparison between the voltage of the flying capacitor 120 and have the input voltage rail (VIN), to generate the compensation control signal 142.

Figure 2B:
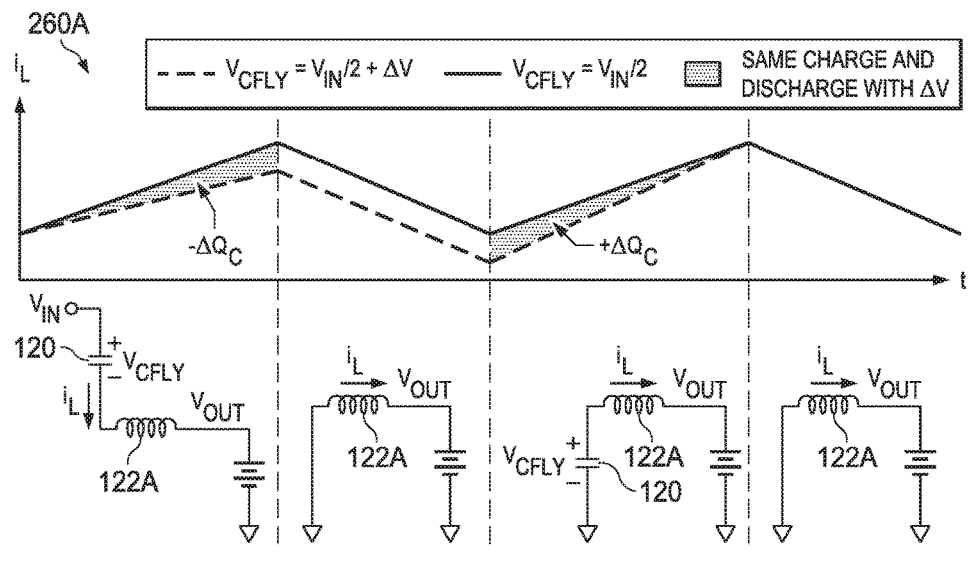
FIG. 2B is an illustrative diagram showing effects of imbalance in the flying capacitor during operation of the multilevel DC-DC converter circuit of FIG. 2A, when notional switches are opened and used in FIG. 2A for the purposes of illustration to disconnect the flying capacitor balancing circuitry.

FIG. 2B is an illustrative diagram showing effects of imbalance in the flying capacitor voltage (VCFLY) during operation of the multilevel DC-DC converter circuit of FIG. 2A, when notional switches are opened and used in FIG. 2A for the purposes of illustration to disconnect the flying capacitor balancing circuitry. In the example of FIG. 2B, graph 260A of output inductor current iL versus time during a cycle of operation of the primary switches 132, 134, 136, 138 is shown to illustrate effects of imbalance in the flying capacitor voltage (VCFLY) during operation of the multilevel DC-DC converter circuit. Imbalance of the flying capacitor voltage (VCFLY) during operation of the multilevel DC-DC converter circuit is recognized as a delta voltage (delta V) deviation of the flying capacitor voltage (VCFLY) from half the DC rail voltage (VIN/2). This is reflected as a delta charge (delta Q) deviation in the graph of output inductor current iL versus time during a cycle of operation of the primary switches in FIG. 2A. In FIG. 2B are also shown simplified equivalent circuit representations versus time during a cycle of operation of the primary switches 132, 134, 136, 138. As shown in the example of FIG. 2B, in a first portion of the cycle, the DC rail voltage VIN charges the flying capacitor 120 and drives an increase in current iL through the output inductor 122A. In a second portion of the cycle, the inductor 122A is ground referenced and the magnetic field of the inductor 122A begins to collapse causing a decrease in current iL through the output inductor 122A. In a third portion of the cycle, the flying capacitor 120 is ground referenced and discharges to drive an increase in current iL through the output inductor 122A. In a fourth portion of the cycle, the inductor 122A is again ground referenced and the magnetic field of the inductor 122A begins to collapse causing a decrease in current iL through the output inductor 122A.

Figure 2C:
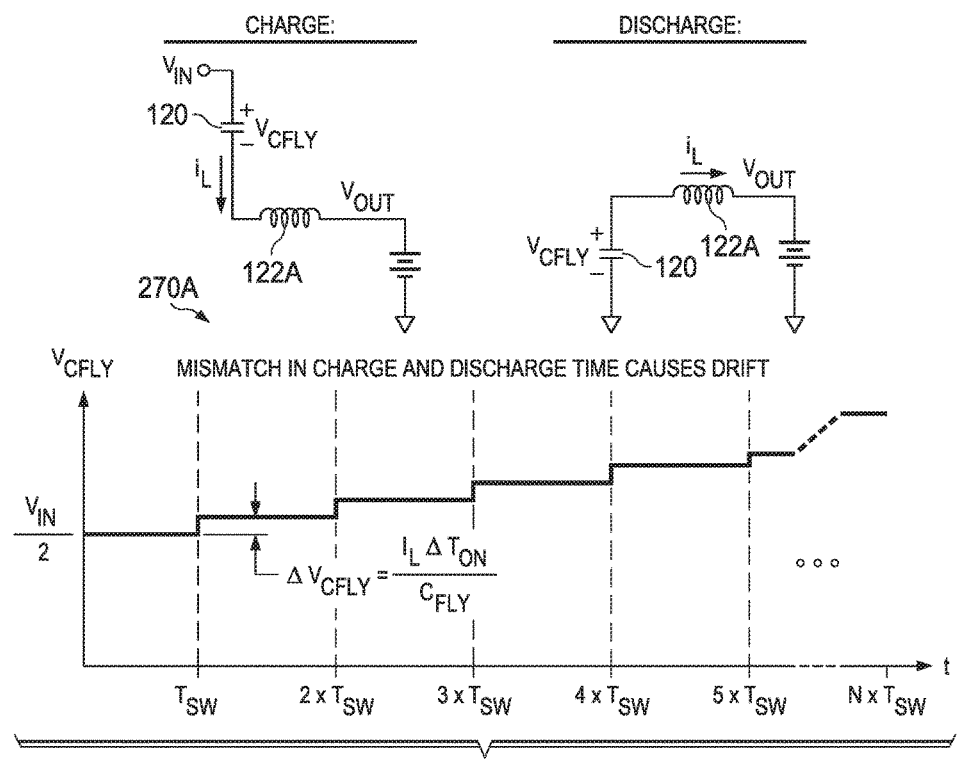
FIG. 2C is an illustrative diagram showing voltage drift in flying capacitor voltage due to imbalance in the flying capacitor during operation of the multilevel DC-DC converter circuit of FIG. 2A, when notional switches are opened and used in FIG. 2A for the purposes of illustration to disconnect the flying capacitor balancing circuitry.

FIG. 2C is an illustrative diagram showing voltage drift in flying capacitor voltage due to imbalance in the flying capacitor 120 during operation of the multilevel DC-DC converter circuit of FIG. 2A, when notional switches are opened and used in FIG. 2A for the purposes of illustration to disconnect the flying capacitor balancing circuitry. In the example of FIG. 2C, equivalent circuits for the charging and discharging of the flying capacitor are again shown to highlight the consequences of mismatch in charge and discharge time as causing drift, as shown in the example graph 270A of flying capacitor voltage (VCFLY) versus time. Expressed mathematically, incremental delta voltage (delta V) deviation of the flying capacitor voltage (VCFLY) from half the DC rail voltage (VIN/2) is equal to the inductor current iL times the charge time mismatch (delta T) divided by the capacitance of the flying capacitor. Undesired deviation of the voltage of the flying capacitor (VCFLY) from half the DC rail voltage (VIN/2), and resulting drift of the flying capacitor voltage (VCFLY) over time is shown in the graph of FIG. 2C.

Figure 3B:
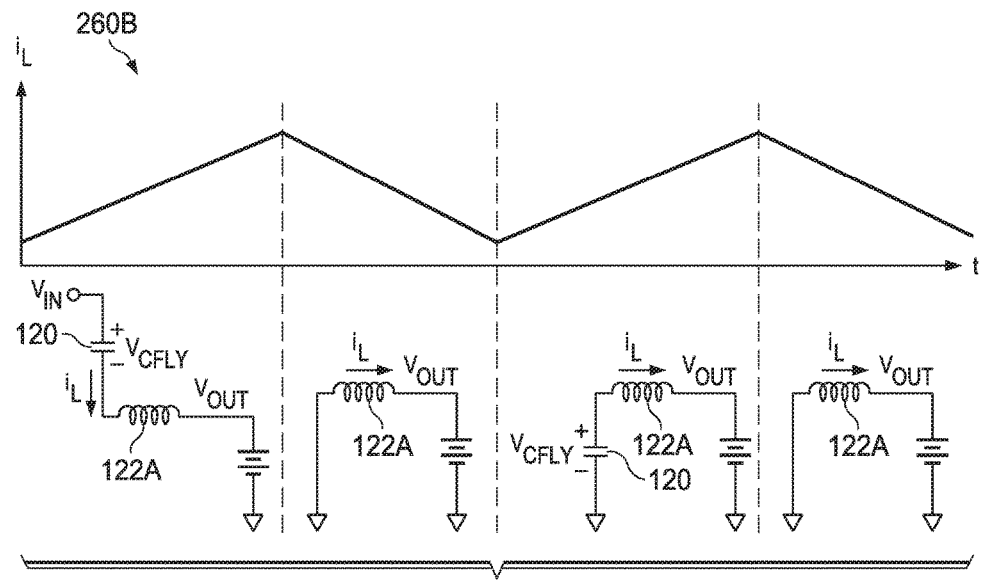
FIG. 3B is an illustrative diagram showing effects of balance in the flying capacitor during operation of the multilevel DC-DC converter circuit of FIG. 3A, when notional switches are closed and used in FIG. 3A for the purposes of illustration to connect for operation of the flying capacitor balancing circuitry.

In contrast to what was just discussed relative to FIG. 2B, FIG. 3B is an illustrative diagram showing effects of balance in the flying capacitor during operation of the multilevel DC-DC converter circuit of FIG. 3A, when notional switches are closed and used in FIG. 3A for the purposes of illustration to connect for operation of the flying capacitor balancing circuitry. In the example of FIG. 3B, a graph 260B of output inductor current iL versus time during a cycle of operation of the primary switches 132, 134, 136, 138 is shown to illustrate effects of balance in the flying capacitor voltage (VCFLY) during operation of the multilevel DC-DC converter circuit in FIG. 3A. Balance of in the flying capacitor voltage (VCFLY) during operation of the multilevel DC-DC converter circuit is recognized as avoiding delta voltage (delta V) deviation of the flying capacitor voltage (VCFLY) from half the DC rail voltage (VIN/2). This is reflected in the graph 260B of output inductor current iL versus time during a cycle of operation of the primary switches in FIG. 3A as an absence of delta Q charge deviation in current iL versus time during a cycle of operation of the primary switches. In FIG. 3B are also shown simplified equivalent circuit representations versus time during a cycle of operation of the primary switches 132, 134, 136, 138 as already discussed previously herein relative to FIG. 2B.

Figure 3C:
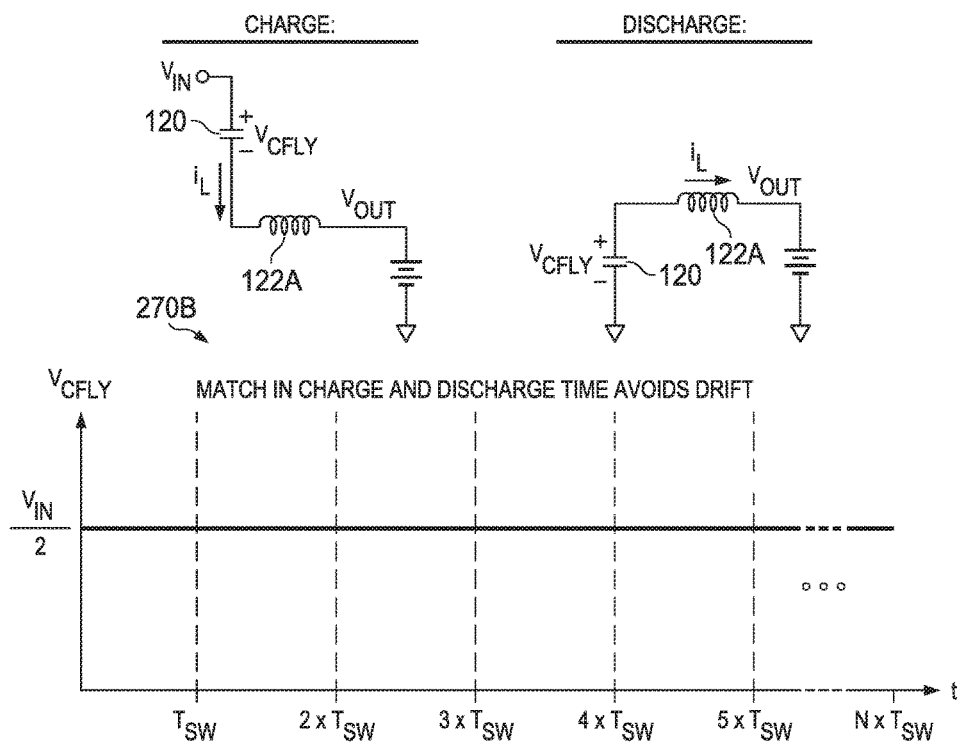
FIG. 3C is an illustrative diagram showing absence of voltage drift in flying capacitor voltage, due to balance in the flying capacitor during operation of the multilevel DC-DC converter circuit of FIG. 3A, when notional switches are closed and used in FIG. 3A for the purposes of illustration to connect for operation of the flying capacitor balancing circuitry.

FIG. 3C is an illustrative diagram showing absence of voltage drift in flying capacitor voltage (VCFLY), due to balance in the flying capacitor 120 during operation of the multilevel DC-DC converter circuit of FIG. 3A, when notional switches are closed and used in FIG. 3A for the purposes of illustration to connect for operation of the flying capacitor balancing circuitry. In the example of FIG. 3C, equivalent circuits for the charging and discharging of the flying capacitor are again shown to highlight the benefits of matching charge and discharge time to avoid drift, as shown in the example graph 270B of flying capacitor voltage (VCFLY) versus time. By using the circuitry of this disclosure to balance flying capacitor voltage (VCFLY) at half the DC rail voltage (VIN/2) over time, as shown in the graph 270B of flying capacitor voltage (VCFLY) versus time in FIG. 3C, undesired deviation of the flying capacitor voltage (VCFLY) form half the DC rail voltage (VIN/2), and drift of the flying capacitor voltage (VCFLY) over time can be avoided.

Figure 4:
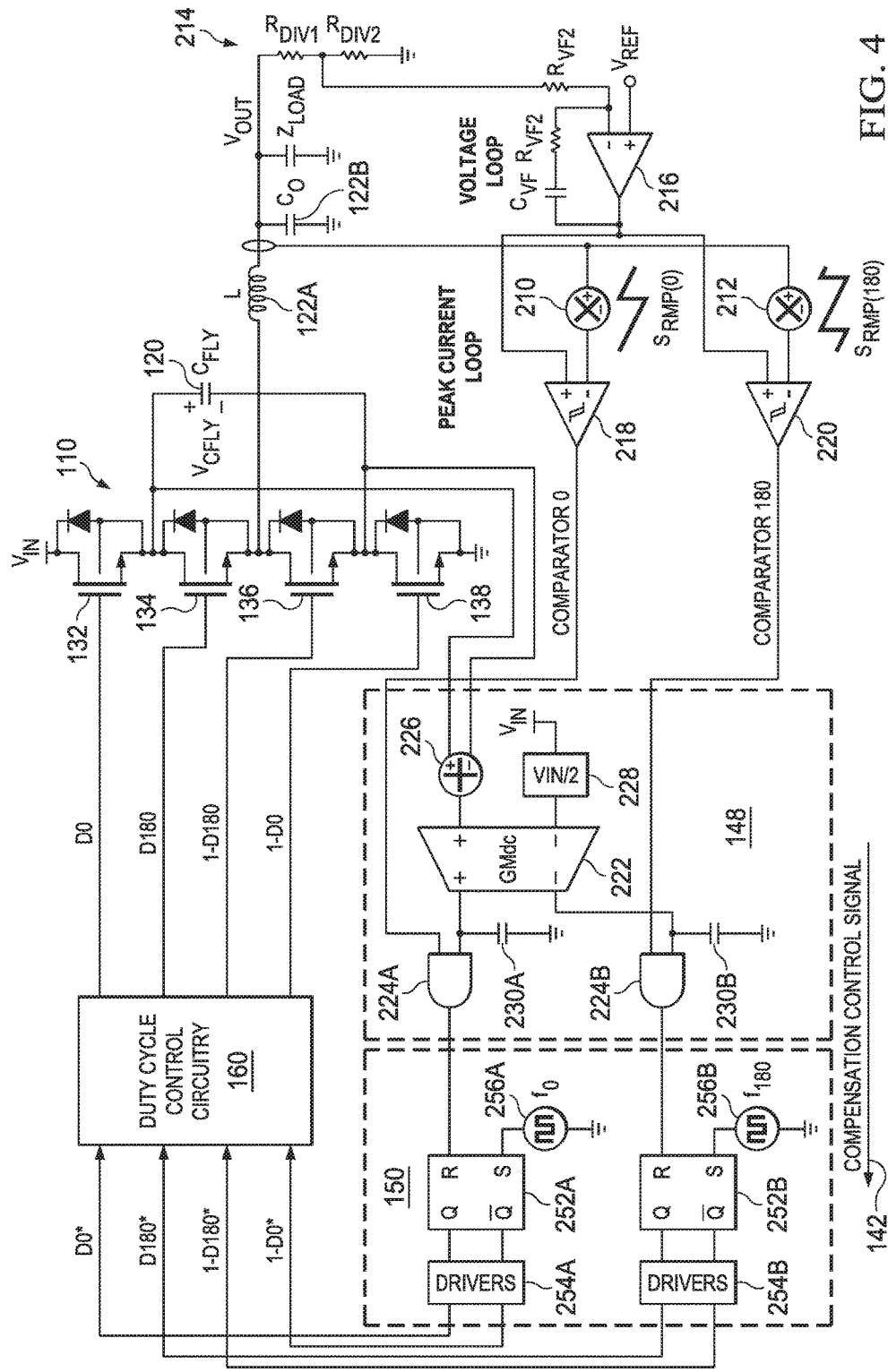
FIG. 4 is a more detailed circuit diagram illustrating Delay Compensation Circuitry of the DC-DC converter of FIG. 3A.

FIG. 4 is a more detailed circuit diagram illustrating Delay Compensation Circuitry 148 for the DC-DC converter of FIG. 3A. It should be noted that no notional switches are employed in the detailed circuit diagram of FIG. 4. As most of the other circuit elements of FIG. 4 have already been discussed previously herein with respect to FIG. 3A, they are not discussed again here, but the reader can refer to their previous discussion with respect to FIG. 3A. In the example of FIG. 4, the Delay Compensation Circuitry 148 includes a differential transconductance amplifier 222 and logic gates 224A, 224B for generating the compensation control signal in response to the difference between the voltage of flying capacitor 120 and half of the DC voltage rail (VIN). The differential transconductance amplifier 222 includes first differential input coupled with a differential voltage of flying capacitor 120 and second differential input coupled with half of the DC voltage rail (VIN/2). The flying capacitor 120 is coupled between differential inputs of a fourth differential amplifier 226 to produce the differential voltage of flying capacitor 120 that is the first differential input of differential transconductance amplifier 222. One half voltage divider 228 is coupled between the DC voltage rail (VIN) and the second differential input of differential transconductance amplifier 222 to produce the half the DC rail voltage (VIN/2) to the second differential input of differential transconductance amplifier 222. As shown in the example of FIG. 4 the differential transconductance amplifier 222 includes differential outputs coupled with respective grounding capacitors 230A, 230B. First and second logic gates 224A, 224B have respective first inputs coupled with the first and second peak current ramp outputs. First and second logic gates 224A, 224B have respective second inputs coupled with the differential outputs of the differential transconductance amplifier. First and second logic gates 224A, 224B have respective outputs of the compensation control signal 142.

While an example manner of implementing the multilevel DC-DC converter circuit topology 110 for the flying capacitor 120, including flying capacitor balancing circuitry is illustrated in FIGS. 1A, 3A and 4, one or more of the elements, processes and/or devices illustrated in FIGS. 1A, 3A and 4 may be combined, divided, re-arranged, omitted, eliminated and/or implemented in any other way. Further, the example flying capacitor 120, the example multilevel DC-DC converter 110, the example voltage difference sense and control circuitry 140, the example compensation control signal 142, the example voltage mode control loop circuitry 144, the example peak current mode control loop circuitry 146, the example delay compensation circuitry 148, the example duty cycle timing adjustment circuitry 150, the example duty cycle control circuitry 160, the example first high side primary switch 132, the example central high side primary switch 134, the example central low side primary switch 136, the example ground referenced low side primary switch 138, the example a first peak current ramp generator 210, the example second peak current ramp generator 212, the example voltage divider 214, the example first differential amplifier 216, the example second differential amplifier 218, the example third differential amplifier 220, the example transconductance differential amplifier 222 and the example first and second logic gates 224A, 224B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). Further still, the example multilevel DC-DC converter circuit topology 110 for the flying capacitor 120, including flying capacitor balancing circuitry as illustrated in FIGS. 1A, 3A and 4 may include one or more elements, processes and/or devices in addition to, or instead of, those illustrated in FIGS. 1A, 3A and 4, and/or may include more than one of any or all of the illustrated elements, processes and devices.

Figure 5:
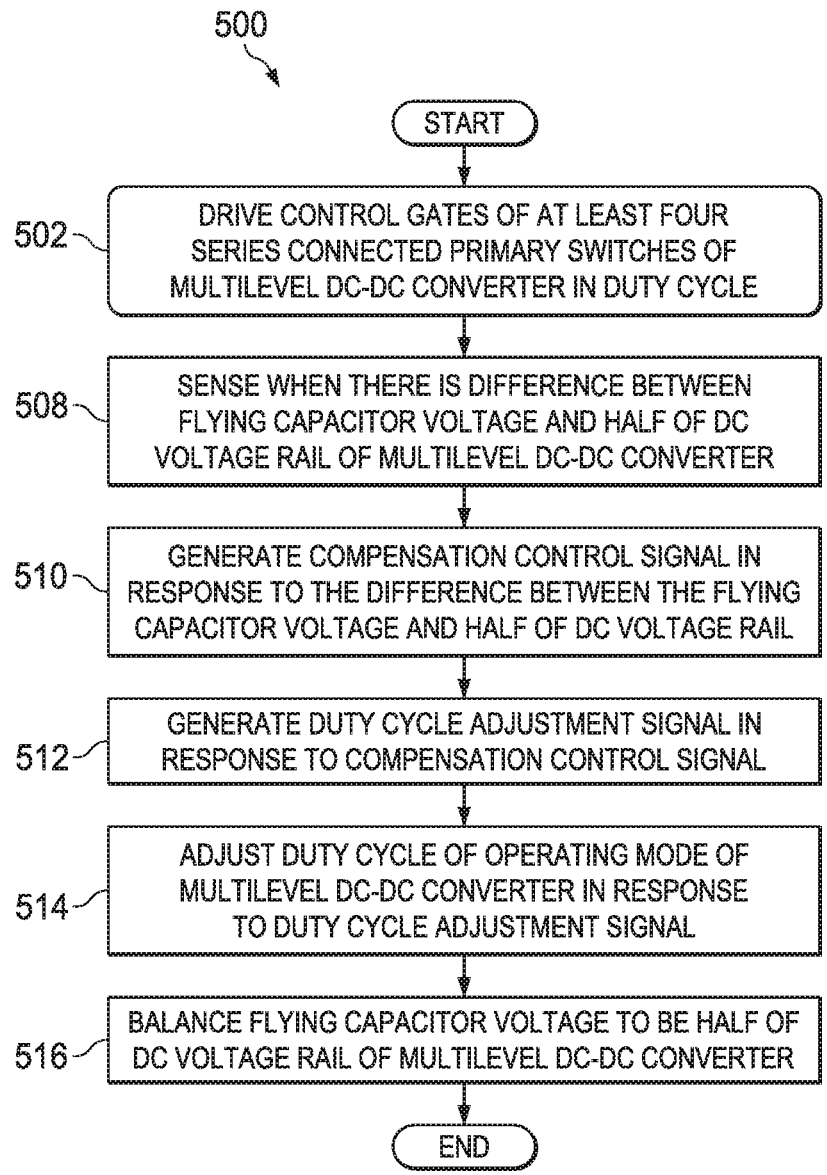
FIG. 5 shows a flowchart representative of example machine readable instructions that may be executed to implement the example system of the flying capacitor balancing circuitry with the multilevel DC-DC converter circuitry topology for the flying capacitor, as shown in the example of FIG. 1A.

FIG. 5 shows a flowchart representative of example machine readable instructions for implementing the system 100 of the flying capacitor balancing circuitry 124 of this disclosure with the multilevel DC-DC converter circuitry topology 110 for the flying capacitor 120, as shown in the example of FIG. 1A. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example flying capacitor balancing circuitry 124 with the example multilevel DC-DC converter 110 of this disclosure may alternatively be used. For example, the order of execution of the blocks may be changed, and/or some of the blocks described may be changed, eliminated, or combined.

FIG. 5 is a process flow representative of an example method 500 to implement the example system 100 of the example flying capacitor balancing circuitry 124 of this disclosure with the example multilevel DC-DC converter circuitry topology 110 for the flying capacitor 120, as shown in the example of FIG. 1A. Although an example method 500 is described with reference to the flowchart illustrated in FIG. 5, many other methods of implementing the example may alternatively be used. For example, the order of execution of the blocks may be changed, and/or some of the blocks described may be changed, eliminated, or combined. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

A process flow 500 of FIG. 5 can begin at block 502. At block 502, the example drive control circuitry 160 drives example control gates of at least four example series connected primary switches 132, 134, 136, 138 of the example multilevel DC-DC converter 110. At block 508, the example voltage difference sense and control circuitry 140 senses when there is a difference between the flying capacitor voltage of the example flying capacitor 120 and half of the DC voltage rail (VIN/2) of the example multilevel DC-DC converter 110. At block 510, the example voltage difference sense and control circuitry 140 generates example compensation control signal 142 in response to the difference between the flying capacitor voltage of the example flying capacitor 120 and half of the DC voltage rail (VIN/2) of the example multilevel DC-DC converter 110. At block 512, the example duty cycle timing adjustment circuitry 150 generates a duty cycle adjustment signal in response to the compensation control signal 142. At block 514, the example duty cycle control circuitry 160 adjusts duty cycle of an operating mode of the example multilevel DC-DC converter 110 in response to the duty cycle adjustment signal. At block 516, the example flying capacitor balancing circuitry 124 balances flying capacitor voltage of the example flying capacitor 120 to be half of the DC voltage rail of the example multilevel DC-DC converter 110. After block 516, the example method 500 can end.

Figure 6:
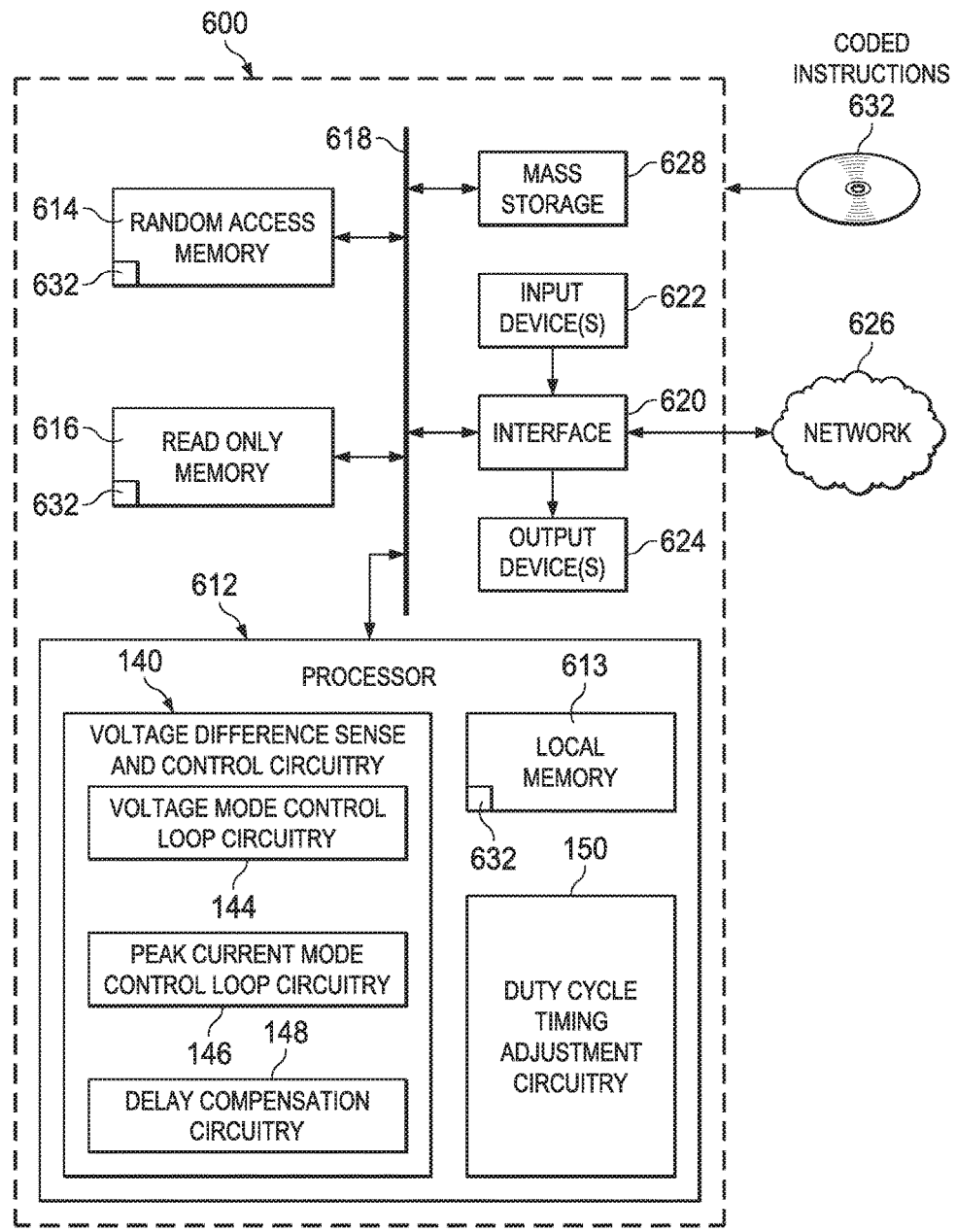
FIG. 6 is a block diagram of an example processing platform capable of executing the machine readable instructions of FIG. 5 to implement the system 100 of the flying capacitor balancing circuitry of this disclosure with the multilevel DC-DC converter circuitry topology for the flying capacitor, as shown in the example of FIG. 1A.

FIG. 6 is a block diagram of an example processing platform capable of executing the machine readable instructions of FIG. 5 to implement the system 100 of the flying capacitor balancing circuitry 124 of this disclosure with the multilevel DC-DC converter circuitry topology 110 for the flying capacitor 120, as shown in the example of FIG. 1A. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware of processor 612 can be virtualized using virtualization such as Virtual Machines and/or containers. The processor 612 can implement example Voltage Difference Sense and Control Circuitry 140. Example Voltage Difference Sense and Control Circuitry 140 can include example Voltage Mode Control Loop Circuitry 144, Peak Current Mode Control Loop Circuitry 146, and Delay Compensation Circuitry 148. The processor 612 can also implement the Duty Cycle Timing Adjustment Circuitry 150.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIG. 5 may be stored in the mass storage device 628, in the volatile memory 614, in the non-volatile memory 616, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to be coupled with a flying capacitor through flying capacitor couplers comprising:
    a multilevel DC-DC converter having an operating mode having a duty cycle and including a series connection of at least four primary switches extending between a DC voltage rail and a ground reference, the at least four primary switches including a central high-side primary switch coupled in series between a first high-side primary switch and a central low-side primary switch, the central low-side primary switch coupled in series between the central high-side primary switch and a ground referenced low-side primary switch;
    flying capacitor couplers including a first coupling node to a series connection of the first high-side primary switch and the central high-side primary switch, the flying capacitor couplers further including a second coupling node to a series connection of the central low-side primary switch and the ground referenced low-side primary switch; and
    voltage difference sense and control circuitry coupled with the DC voltage rail and the first coupling node of the flying capacitor to sense when there is a difference between a voltage of flying capacitor and half of the DC voltage rail, and to generate a compensation control signal in response to the difference between the voltage of flying capacitor and half of the DC voltage rail.

2. The apparatus as in claim 1 including duty cycle timing adjustment circuitry coupled with the voltage difference sense and control circuitry to generate a duty cycle adjustment signal in response to the compensation control signal generated by the voltage difference sense and control circuitry.

3. The apparatus as in claim 2 including duty cycle control circuitry coupled between the duty cycle timing adjustment circuitry and control gate inputs of the four primary switches of the multilevel DC-DC converter to adjust duty cycle of the operating mode of the multilevel DC-DC converter in response to the duty cycle adjustment signal, and to balance the voltage of the flying capacitor to be half of the DC voltage rail.

4. The apparatus as in claim 1 in which the voltage difference sense and control circuitry includes peak current mode control loop circuitry operating to control balance of the voltage of the flying capacitor at half of the DC voltage rail.

5. The apparatus as in claim 4 in which the voltage difference sense and control circuitry includes voltage mode control loop circuitry operating to further control balance of the voltage of the flying capacitor at half of the DC voltage rail.

6. The apparatus as in claim 4 in which the peak current mode control loop circuitry includes a first peak current ramp generator generating a first peak current ramp output and further includes a second peak current ramp generator generating a second peak current ramp output, the first and second peak current ramp generators being in antiphase with one another.

7. The apparatus as in claim 5 in which:
    the multilevel DC-DC converter includes an output node coupled between the central high-side primary switch and the central low-side primary switch; and
    the peak current mode control loop circuitry includes an input coupled with the output node of the multilevel DC-DC converter to sense a peak current at the output node of the multilevel DC-DC converter when the multilevel DC-DC converter is operating in the operating mode of the multilevel DC-DC converter.

8. The apparatus as in claim 5 in which:
    the multilevel DC-DC converter includes an output node coupled between the central high-side primary switch and the central low-side primary switch; and
    the voltage mode control loop circuitry includes an input coupled with the output node of the multilevel DC-DC converter to sense a voltage at the output node of the multilevel DC-DC converter when the multilevel DC-DC converter is operating in the operating mode of the multilevel DC-DC converter.

9. The apparatus as in claim 8 in which:
    the voltage mode control loop circuitry includes voltage divider circuitry to divide the voltage sensed at the output node of the multilevel DC-DC converter into a divided voltage; and
    the voltage mode control loop circuitry includes a first differential amplifier to compare a voltage reference to the divided voltage and to generate an output difference voltage signal.

10. The apparatus as in claim 9 in which:
    the peak current mode control loop circuitry includes an input coupled with the output node of the multilevel DC-DC converter to sense a peak current at the output node of the multilevel DC-DC converter when the multilevel DC-DC converter is operating in the operating mode of the multilevel DC-DC converter;
    the peak current mode control loop circuitry includes a first peak current ramp generator generating a first peak current ramp output in response to the peak current sensed at the output node of the multilevel DC-DC converter; and the peak current mode control loop circuitry includes a second differential amplifier to compare the first peak current ramp output of the first peak current ramp generator to the output difference voltage signal of the voltage mode control loop circuitry and to generate a first peak current difference signal.

11. The apparatus as in claim 10 in which:

the peak current mode control loop circuitry includes a second peak current ramp generator generating a second peak current ramp output in response to the peak current sensed at the output node of the multilevel DC-DC converter; and the peak current mode control loop circuitry includes a third differential amplifier to compare the second peak current ramp output of the second peak current ramp generator to the output difference voltage signal of the voltage mode control loop circuitry and to generate a second peak current difference signal.

12. The apparatus as in claim 1 in which the voltage difference sense and control circuitry includes delay compensation circuitry, the delay compensation circuitry including a differential transconductance amplifier and logic gates for generating the compensation control signal in response to the difference between the voltage of the flying capacitor and half of the DC voltage rail.

13. The apparatus as in claim 11 in which the voltage difference sense and control circuitry includes delay compensation circuitry including:

a differential transconductance amplifier including differential inputs coupled with the voltage of the flying capacitor and half of the DC voltage rail, and the differential transconductance amplifier including differential outputs; and first and second logic gates having respective first inputs coupled with the first and second peak current ramp outputs, having respective second inputs coupled with the differential outputs of the differential transconductance amplifier, and having respective outputs of the compensation control signal.

14. The apparatus as in claim 1 in which the multilevel DC-DC converter is a three level DC-DC converter.

15. A method of operating a multilevel DC-DC converter in an operating mode having a duty cycle, the method comprising:

driving respective control gates of at least four series connected primary switches of the multilevel DC-DC converter in the duty cycle of the operating mode; and sensing when there is a difference between a voltage of a flying capacitor and half of a DC voltage rail of the multilevel DC-DC converter; and generating a compensation control signal in response to the difference between the voltage of flying capacitor and half of the DC voltage rail.

16. The method as in claim 15 including generating a duty cycle adjustment signal in response to the compensation control signal.

17. The method as in claim 16 including adjusting the duty cycle of the operating mode of the multilevel DC-DC converter in response to the duty cycle adjustment signal.

18. The method as in claim 17 including balancing the voltage of the flying capacitor to be half of the DC voltage rail of the multilevel DC-DC converter.

19. An apparatus comprising:

a multilevel DC-DC converter having an operating mode having a duty cycle and including a series connection of at least four primary switches extending between a DC voltage rail and a ground reference, the at least four primary switches including a central high-side primary switch coupled in series between a first high-side primary switch and a central low-side primary switch, the central low-side primary switch coupled in series between the central high-side primary switch and a ground referenced low-side primary switch;

a flying capacitor including a first coupling node to a series connection of the first high-side primary switch and the central high-side primary switch, the flying capacitor further including a second coupling node to a series connection of the central low-side primary switch and the ground referenced low-side primary switch; and voltage difference sense and control circuitry coupled with the DC voltage rail and the first coupling node of the flying capacitor to sense when there is a difference between a voltage of flying capacitor and half of the DC voltage rail, and to generate a compensation control signal in response to the difference between the voltage of flying capacitor and half of the DC voltage rail.

20. The apparatus as in claim 19 including:

duty cycle timing adjustment circuitry coupled with the voltage difference sense and control circuitry to generate a duty cycle adjustment signal in response to the compensation control signal generated by the voltage difference sense and control circuitry; and duty cycle control circuitry coupled between the duty cycle timing adjustment circuitry and control gate inputs of the four primary switches of the multilevel DC-DC converter to adjust duty cycle of the operating mode of the multilevel DC-DC converter in response to the duty cycle adjustment signal, and to balance the voltage of the flying capacitor to be half of the DC voltage rail.

* * * * *